United States Patent [19]

Petros

[11] 4,372,626
[45] Feb. 8, 1983

[54] TAPER JOURNAL BEARING FOR ROLLS FOR USE IN ROLLING MILLS

[75] Inventor: Andrew J. Petros, Oakdale, Pa.

[73] Assignee: Mesta Machine Company, Pittsburgh, Pa.

[21] Appl. No.: 301,373

[22] Filed: Sep. 11, 1981

[51] Int. Cl.³ .............................................. F16C 33/04
[52] U.S. Cl. ..................................... 384/129; 384/281
[58] Field of Search ........... 308/37, 20, 237 A, 237 R, 308/238; 29/110

[56] References Cited

U.S. PATENT DOCUMENTS

| | | | |
|---|---|---|---|
| 2,620,243 | 12/1952 | Beatty | 308/20 |
| 3,106,432 | 10/1963 | Opferkuch | 308/70 |
| 4,090,553 | 5/1978 | Beghin | 29/110 |
| 4,093,321 | 6/1978 | Ikariishi | 308/20 |

*Primary Examiner*—Lenard A. Footland
*Attorney, Agent, or Firm*—Carothers and Carothers

[57] ABSTRACT

A taper journal bearing for rolls for use in rolling mills including a keying arrangement for keying the roll neck sleeve to the roll neck. The bearing includes a bushing housed in a roll bearing chock, a sleeve closely fitted onto a tapered journal or roll neck of the roll, an oil film deposited between the bushing and the sleeve, and a key arrangement for fixing the sleeve to the roll wherein a flat is machined on the outer end of the taper on the surface of the taper journal of the roll in parallel to the taper with this flat underlying one end of the sleeve at the outer end of the load zone of the roll neck. A keyway is provided in one end of the sleeve such that it is open to and in registration with the flat machined on the roll neck taper. A key is slidably received in the keyway and has a tapered flat surface in sliding engagement with the flat on the roll taper to create a wedging action against the flat when the key is urged into the keyway. This substantially reduces the undercut section of the sleeve and the roll in the roll neck load zone and eliminates any voids and clearances in the keyway thereby eliminating the increased variations in the reduction force taking place at each rotation of the roll due to deformation of the sleeve.

5 Claims, 2 Drawing Figures

TAPER JOURNAL BEARING FOR ROLLS FOR USE IN ROLLING MILLS

This invention relates to a taper journal bearing for rolls for use in rolling mills.

As pointed out in U.S. Pat. No. 4,093,321 issued June 6, 1978, a taper journal bearing of the prior art for a mill roll provides a bearing surface with oil film between a bushing, housed in a bearing box of a roll stand, and a sleeve closely fitted on a taper journal on a roll. A key is provided between the sleeve and the taper journal of the roll to prevent relative movement therebetween. A prior art bearing of this type is illustrated in FIG. 1 of U.S. Pat. No. 4,093,321. This reference points out that they often encounter a problem of variation in reduction force due to an eccentricity of a rotating axis of the roll, the term "reduction force" meaning a force acting upon mill rolls for rolling plates therebetween. This reference further points out that with the use of oil film bearings, it has been difficult to eliminate the variation in reduction force and that violent changes in reduction force occur in rolling mills using plain bearings with oil film and it was found that it was caused by the keyway formed in the sleeve for the key for the purpose of preventing the relative movement of the taper journal and sleeve.

These keyways of the prior art are formed on the inside of the sleeve and are somewhat deeper than the height of the key extending beyond the taper journal to form a clearance between the key and a bottom of the groove or keyway of the sleeve. Such a clearance between the key and the bottom of the groove permits an elastic deformation of the sleeve to abruptly reduce the reduction force at the moment when the keyway of the sleeve comes in registry with a plane where the sleeve is subjected to the reduction force.

In order to avoid the abrupt change in reduction force according to the invention disclosed in U.S. Pat. No. 4,093,321, the key for preventing the relative movement of the sleeve to the taper journal of the roll was removed from the taper journal, which is the load zone of the roll neck upon which the reduction force acts directly, to an area upon which the reduction force does not act. Those inventors accomplish this by providing a key in a keyway arrangement between a straight neck portion of the roll adjacent the taper journal and a sleeve retainer covering this straight neck. This arrangement apparently eliminated abrupt changes in reduction force effectively. However, such a keying arrangement requires a special mill roll with a straight neck machined therein in addition to the taper journal. Thus, considerable expense is encountered in providing such unconventional rolls, and the keying system is not adaptable to existing mill rolls with a taper journal without providing a completely new roll and completely modifying the bearing box and bearing retainers to fit the new roll configuration.

It is a principal object of the present invention to likewise effectively reduce the abrupt change in reduction force, but with a novel arrangement which is readily adaptable to existing mill stands.

The taper journal bearing of the present invention provides for a keying arrangement which is still positioned in the load zone of the roll neck in an area which is subjected to a rolling force acting upon the sleeve, yet, effectively eliminates the abrupt change in reduction force, contrary to the teachings of U.S. Pat. No. 4,093,321.

The taper journal bearing of the present invention for rolls for use in rolling mills and the like, comprises a bushing housed in a roll bearing chock, a sleeve closely fitted onto a taper journal end of the roll, an oil film deposited between the bushing and the sleeve, and a key and keyway arrangement for fixing the sleeve to the roll. This key and keyway arrangement consists of a flat which is machined on the outermost end of the taper on the surface of the taper journal of the roll and in parallel to the taper thereof. This flat machined on the roll taper underlies one end of the sleeve. A keyway is further provided in the same end of the sleeve and is open to and registers with the flat machined on the roll taper. A key is slidably received in the keyway and has a tapered flat surface which mates in sliding engagement with the flat on the roll taper to create a wedging action against the flat when the key is slidably urged into the keyway. This arrangement eliminates the undesirable clearance provided in keying arrangements of the prior art which had a clearance between the key and the bottom of the keyway groove which permits an elastic deformation of the sleeve to abruptly reduce the reduction force at the moment when the keyway of the sleeve comes in registry with a plane where the sleeve is subjected to the reduction force in keying arrangements of the prior art.

With the taper journal bearing of the present invention, the keying arrangement also is positioned at the very end of the load zone of the taper roll neck, thus further minimizing the effect of the keying arrangement on the deformation and rigidity of the roll neck and sleeve.

A slide guideway is further preferably provided in the keyway in the end of the sleeve to retain the key therein in absence of the roll taper journal being positioned in the sleeve. For example, the slide guideway for the key may consist of rounded ends or sides in the keyway that slidably mate with rounded ends on the key.

Spring means are also preferably provided to continually urge the key into the keyway. This provides a wedging action by the key outwardly against the sleeve and inwardly against the tapered flat machined on the mill roll taper journal. This assures that there is no clearance between the key and the flat machined on the mill roll. In addition, all of the keying is positioned at the very end of the load zone of the roll neck, which was not possible with keying arrangements of the prior art which were provided in the load zone of the roll neck.

Other objects and advantages appear in the following description and claims.

The accompanying drawings show, for the purpose of exemplification without limiting the invention or the claims thereto, certain practical embodiments illustrating the principles of this invention wherein:

Figure 1:
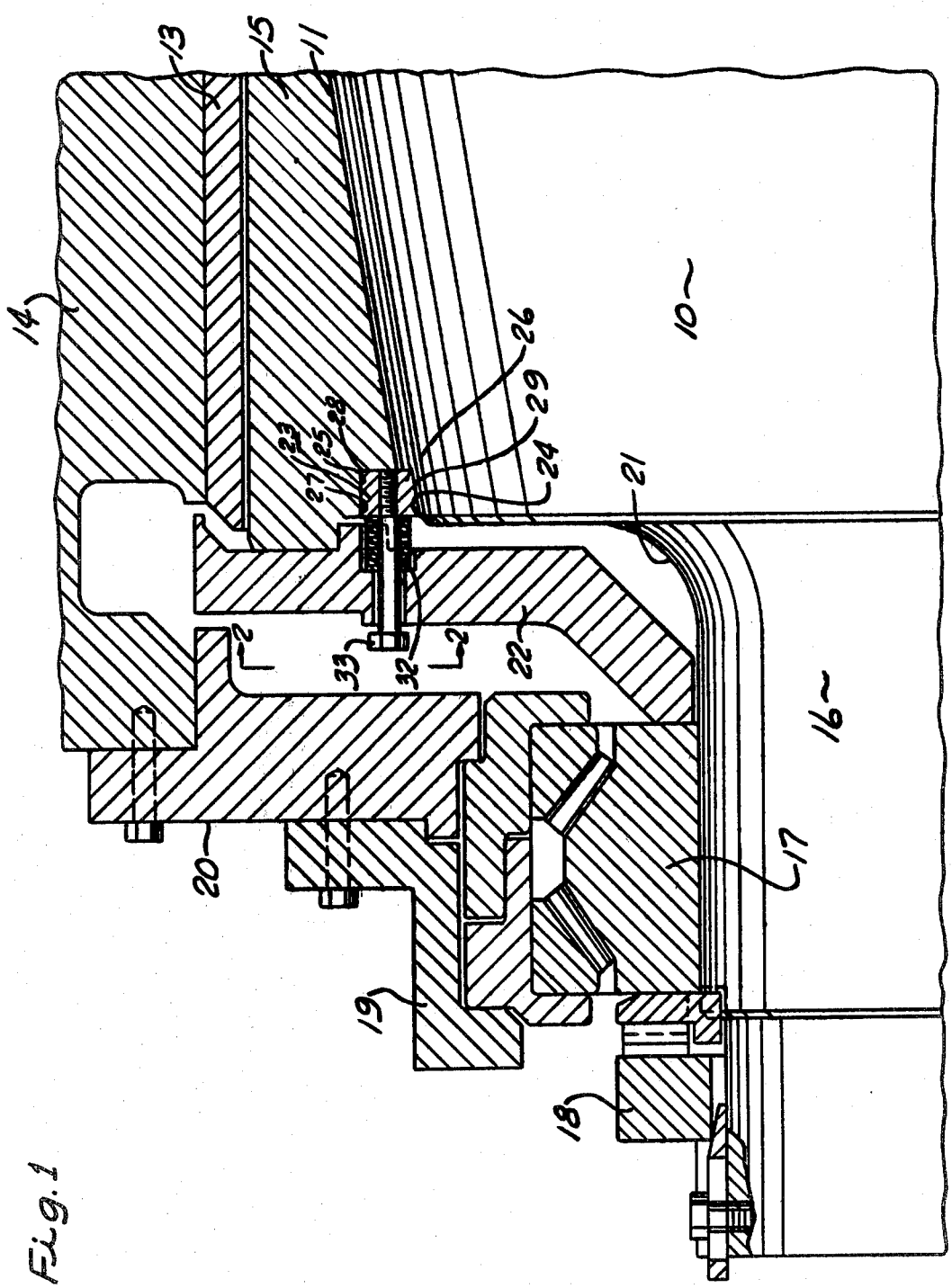
FIG. 1 is a vertical sectional view of a portion of a taper journal bearing of a preferred embodiment according to the present invention.

Referring to the drawings, there is shown one end of a mill roll 10 for a rolling mill having a taper journal or tapered roll neck 11. A bearing for the taper journal as shown is a taper oil film bearing of the prior art wherein a bearing surface with oil film is provided between a bushing 13 housed in a bearing box or bearing chock 14 of a roll stand with a sleeve 15 closely fitted on the taper journal 11. In general, the roll 10 has two taper bearings, only one of which will be described in detail, since they are symmetrically the same.

The straight neck end portion 16 of roll 10 is additionally journaled in thrust bearing 17. Thrust bearing 17 is held in place by the locking arrangement 18 and bearing box end plate 20 bolted to bearing box 14 and a bearing cover 19 bolted to end plate 20. The fillet 21 of the roll neck of roll 10 is covered with sleeve retainer 22, which is annularly bolted to the end of sleeve 15. A fixing means or key means 23 is provided for fixing sleeve 15 to taper journal 11 for rotation therewith. Key means 23 consists of a flat 24 machined on the outer end of the taper journal at the end of the load zone of the taper roll neck 11 on the surface thereof with the plane of the flat 22 parallel to the taper of roll neck taper journal 11, as is best seen in FIG. 1. This machined flat 24 underlies one end or the outer end of sleeve 15.

A keyway 25 is machined in the same end of sleeve 15, and is open on the inside thereof to register with flat 24 machined in roll 10. This keyway 25 slidably receives elongated key 26, which completely fills the keyway in that no voids are left between key 26 and the flat 24 and key 26 and the upper surface 27 of keyway 25.

The upper surface 28 of key 26 is flat and flushly mates the upper surface 27 of keyway 25. The bottom surface 29 of key 26 is flat, but it is inclined or tapered relative to surface 28 to exactly mate with taper of flat 24 in roll 10. Thus, when key 26 is urged into the keyway, it creates a wedging action against flat 24 and against upper keyway wall 27, filling all voids therebetween and eliminating any possible voids which would create abrupt changes in reduction force.

Figure 2:
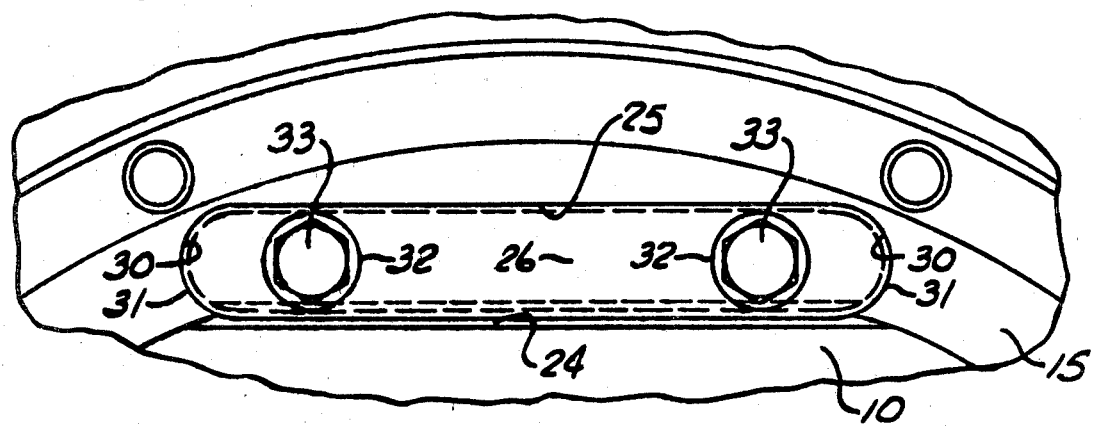
FIG. 2 is an end view of a portion of the keying arrangement illustrated in the taper journal bearing of FIG. 1 as viewed from section line 2-2 with the sleeve end retainer removed to permit full view of the keying arrangement.

With more particular reference to FIG. 2, it can be seen that keyway 25 includes a slide guideway for key 26, which in this instance is provided by the rounded ends 30 of keyway 25, which closely mates in sliding relationship the rounded end 31 of key 26. This slide guideway maintains key 26 in position in the end of sleeve 15, even though roll 10 may not yet have been inserted into sleeve 15.

In order to continually urge key 26 into the keyway 25 and to insure that the aforedescribed voids are filled, even under conditions of contraction and expansion, and to insure that the key creates a wedging action between sleeve 15 and the flat 24 of roll 10, a spring is provided in the form of a stacked plurality of disc springs 32, which provide a disc spring assembly to continually urge key 26 into keyway 25. The two bolts are merely provided to maintain the key and spring assembly together.

Thus, the key 26 is forced between the roll neck 11 and sleeve 15. It insures snug engagements so that the sleeve will be held in place and will not move at all relative to the roll neck. In addition, the tapered key 26 provides easier roll insertion into the bearing assembly.

It should also be kept in mind that this arrangement is readily adaptable to already existing mill roll stands. The procedure would be as follows. A flat 24 is machined on the end of the taper journal 11 as illustrated in the Figures, and the keyway with rounded edges is machined as disclosed into the end of roll neck sleeve 15. The rounded ends 31 of the keyway accurately locate, restrain and guide the spring loaded taper key 26 in its assembly. The key is made with a taper to fit the cavity formed by the roll end and sleeve, and a thrust load is applied by the disc spring assembly 32, which forces the key into the cavity and engages firmly both top and bottom flats 27 and 24.

The end retainer 22 is drilled to receive the shoulder bolts 33 that are threaded into the key 26. The disc springs 32 are inserted over the bolts before assembly of the bolts to the key 26. The old keyway in both the sleeve 15 and the roll 10 are filled and the roll is assembled into the bearing assembly. Thus, with only slight modifications, all of the existing assembly and materials are utilized.

When inserting the roll 10 into the bearing chock assembly or bearing box 14, the tapered flat 29 of the bearing sleeve key 26 is located parallel to the position of the roll neck flat 24 on roll 10 being inserted. This tapered flat of key 26 provides a guide so that the insertion of roll 10 into the bearing assembly is easily accomplished.

With this design, the length of the prior art keyway slots has been drastically reduced, and the former keyway function is replaced by the flat 24 machined into roll 10. With this arrangement also, the reduced discontinuities are now all positioned at the very end of the load zone of the roll neck taper journal 11, therefore, absolutely minimizing the effect on the deformation and rigidity of the roll neck and sleeve. Thus, abrupt variations in reduction force are minimized, even though the keying arrangement of the present invention is still positioned in the load zone of the roll neck or an area thereof that is directly subjected to a rolling force acting upon sleeve 15.

I claim:

1. A taper journal bearing for rolls for use in rolling mills, comprising a bushing housed in a roll bearing chock, a sleeve closely fitted onto a taper journal end of the roll, an oil film deposited between said bushing and said sleeve, and key means for fixing said sleeve to said roll; the improvement comprising, said key means consisting of a flat machined outer end of the taper on the surface of the taper journal of said roll in parallel to the taper thereof and underlying one end of said sleeve, a keyway in said one end of said sleeve and open to and registering with said flat, a key slidably received in said keyway and having a tapered flat surface mating in sliding engagement with said flat to create a wedging action against said flat when said key is slidably urged into said keyway.

2. The taper journal bearing of claim 1, including slide guideway means in said keyway to retain said key therein in the absence of said roll taper journal in said sleeve.

3. The taper journal bearing of claim 2, wherein said slide guideway means consists of rounded ends in said keyway and mating rounded ends on said key slidably mating therewith.

4. The taper journal bearing of claim 1, including spring means continually urging said key into said keyway.

5. The taper journal bearing of claim 1, wherein said key tapered flat surface fully engages said flat.

* * * * *